United States Patent [19]

Blake et al.

[11] Patent Number: 4,594,076
[45] Date of Patent: Jun. 10, 1986

[54] METHOD AND COMPOSITION FOR REDUCING THE STRENGTH OF ICE

[75] Inventors: Robert J. Blake, Yorktown Heights; Joseph E. Sokolik, Jr., Carmel, both of N.Y.

[73] Assignee: Union Carbide Corporation, Danbury, Conn.

[21] Appl. No.: 554,818

[22] Filed: Nov. 23, 1983

Related U.S. Application Data

[62] Division of Ser. No. 79,892, Sep. 28, 1979.

[51] Int. Cl.$^4$ .................................................. C10L 9/10
[52] U.S. Cl. ............................................ 44/6; 252/70; 106/13
[58] Field of Search .................. 252/70; 106/13; 44/6

[56] References Cited

U.S. PATENT DOCUMENTS

| | | | |
|---|---|---|---|
| 1,780,927 | 11/1930 | Jordan | 252/73 |
| 1,943,268 | 1/1934 | Fleischer | 200/34 |
| 3,096,290 | 7/1963 | Duane | 106/13 |
| 3,378,493 | 4/1968 | Jacoby | 252/70 |
| 3,537,900 | 11/1970 | Holbert et al. | 106/13 |
| 3,705,854 | 12/1972 | Gunning | 252/70 |
| 3,794,472 | 2/1974 | Macaluso | 44/6 |
| 4,117,214 | 9/1984 | Parks et al. | 44/6 |
| 4,162,347 | 7/1979 | Montgomery | 106/13 |
| 4,163,079 | 7/1979 | Beafore | 106/13 |

Primary Examiner—William R. Dixon, Jr.
Assistant Examiner—Margaret B. Medley
Attorney, Agent, or Firm—Henry H. Gibson

[57] ABSTRACT

This invention is directed to the reduction of the strength of ice in association with solid particulate materials, such as, for example, coal, by applying to the solid particulate material, prior to exposure to water freezing conditions, a composition comprising a mixture of a glycol derived from ethylene oxide and containing from 1 to 4 oxyethylene units and an alkyl and/or an aryl ether of a glycol derived from ethylene oxide and/or propylene oxide and containing from 1 to 9 oxyalkylene units.

6 Claims, No Drawings

METHOD AND COMPOSITION FOR REDUCING THE STRENGTH OF ICE

This application is a division of prior U.S. application Ser. No. 79,892 filed Sept. 28, 1979.

This invention is directed to reducing the strength of adhesion of solid particulate materials obtained under freezing conditions by ice formation between particles. In particular, this invention is directed to the addition to the surface of solid inorganic particulate materials of a composition which causes weakening and collapsing of inter-particulate ice bonds that form in the material, such weakening and collapsing occurring in many cases when a stress is applied, typically from the weight of a mass of the particles. In particular, this invention is specially adapted to the treatment of particulate coal to enhance its bulk handling characteristics under low temperature (i.e., freezing) conditions.

BACKGROUND OF THE INVENTION

There is described in the literature the use of a number of compositions for reducing the interbonding effect of ice formation between particulate materials. In U.S. Pat. No. 4,117,214 to Parks and Nimerick, there is described the use of a composition of (a) water-soluble polyhydroxy compound or monoalkylether thereof and (b) a water-soluble organic nonvolatile compound having a hydrophilic group, such as amine, carboxyl or carboxylate, in an amount which is effective to weaken the physical integrity of ice when added to water prior to its being frozen. Such a composition can be applied to inorganic particulate masses which contain water and when the masses are subjected to freezing conditions, the composition becomes incorporated into the ice formed and renders the ice physically weak when the mass has to be separated. This can be demonstrated by the fragility imparted to an ice cube, see Procedure (A), infra. The patent, in particular, is concerned with the treatment of coal placed in hopper cars so that when coal is transported under freezing weather conditions, the ice does not adversely affect one's ability to remove the coal from the hopper cars. In this respect, the patent refers to an article in *Business Week*, Feb. 14, 1977, pages 32-34, to characterize the severity of the freezing problem as it applies to the transportation of inorganic particulate materials, in particular, coal.

The particular composition which this patent indicates to be the most desirable for use in the treatment of coal subjected to freezing weather conditions is a blend of 47.5 wt. % ethylene glycol, 47.5 wt. % propylene glycol, and 5 wt. % sodium acetate. The patentees also describe in broader terms the kind of composition which they regard as capable of affecting the cohesive strength of ice formed about solid particulate materials. One of the ingredients, according to the patent, is a polyhydroxy alkane and typical members of that class are ethylene glycol, diethylene glycol, glycerine, and sugar. Of those, ethylene glycol is indicated as preferred. In addition, the patentees mention that a mixture of those glycols may be employed as a first component of the total composition and illustrative of that is a mixture such as ethylene glycol and 1,2-propylene glycol. The second material which is used in the composition for treating the particulates is a "water-soluble organic nonvolatile compound". Although this compound is extremely broadly defined, the specific illustrations set forth in the patent are materials such as fumaric acid, urea, glycolic acid, tetrasodium salt of ethylene diamine tetraacetic acid, sodium acetate and acetic acid. The polymeric materials described are polyacrylamide, polyvinyl pyrrolidone, polyethyleneimine, polyacrylates, polyamide copolymers, such as that sold commercially as Arco S-232, and the natural gums, such as guar gum.

A factor in distinguishing the process of U.S. Pat. No. 4,117,214 from what had been utilized in the prior art in ice treatments involves the quantity of the treating agent that the patentees supply to the particulate mass to prevent the kind of ice formation which precludes the breaking apart of a particulate mass. The patentees use less of the treating agent than is normally employed in antifreeze conditions or in deicing situations.

The compositions of this invention can impart a higher degree of fragileness to ice formed in the particulate mass than the compositions described in U.S. Pat. No. 4,117,214 and the instant composition represents an improvement over said prior art composition. Also, the compositions of this invention have a lower viscosity than the compositions described in U.S. Pat. No. 4,117,214. This lower viscosity facilitates spraying the compositions onto the particulate matter. The lower viscosity also permits greater penetration of the composition into the particulate matter, such as coal.

THE INVENTION

This invention is directed to compositions for the treatment of particulate matter subjectable to water freezing conditions which comprises a liquid solution of a mixture of at least one glycol derived from ethylene oxide and containing from 1 to 4 oxyethylene units and at least one alkyl and/or an aryl ether of a glycol derived from ethylene oxide and/or propylene oxide and containing from 1 to 9 oxyalkylene units. The solution may also contain propylene glycol and/or water.

The glycol derived from ethylene oxide and containing from 1 to 4 oxyethylene units includes ethylene glycol, diethylene glycol, triethylene glycol, and tetraethylene glycol, and mixtures thereof, with ethylene glycol being preferred.

The alkyl and/or aryl ether of a glycol derived from ethylene oxide and/or propylene oxide and containing from 1 to 9 oxyalkylene units is selected from one or more compounds of the following formulae:

$$HO\text{-}(CH_2CH_2O)_{\overline{n}}R \qquad (I)$$

$$HO\text{-}(CH_2CH\text{-}O)_{\overline{n}}R \qquad (II)$$
$$\qquad\quad |$$
$$\qquad\, CH_3$$

wherein R is alkyl, aryl, alkylaryl or arylalkyl containing 1 to 15 carbon atoms, and n is an integer of from 1 to 9.

The preferred alkyl ether of a glycol is ethylene glycol ethylether and has the following formula: $CH_3CH_2OCH_2CH_2OH$. This ether is commercially available under the designation Cellosolve ® Solvent (sold by Union Carbide Corporation).

The mixture of this invention contains from about 65 to about 95, preferably from about 75 to about 85 weight percent of ethylene glycol and/or propylene glycol and from about 1 to about 25, preferably from about 10 to about 20 weight percent of the alkyl and/or aryl ether of a glycol.

The composition may also contain water. The water may be present in amounts of up to about 30 weight percent, preferably from about 5 to about 10 weight percent, of the total weight of the composition.

The preferred composition contains ethylene glycol, ethylene glycol ethylether, and water.

The amount of the composition of this invention which is typically supplied to the inorganic mass is about 0.5 wt %, or less, based upon moisture content in the inorganic particulate mass being treated. Larger amounts can be employed but they are not ordinarily required. The amount to use can be determined by measuring the moisture content of the inorganic particulate mass (see e.g., ASTM D-3302-74) and supplying to that mass, in an uniform manner, the composition of this invention in the amount which test data shows to provide the desired amount of fragileness (or brittleness) to the particulate mass when brought to a frozen state. The degree of fragility imparted to the ice which is formed by utilizing the compositions of this invention has been proven according to laboratory tests to be significantly greater than that which is achieved utilizing the most desirable composition of U.S. Pat. No. 4,117,214, to wit, 47.5 wt. % ethylene glycol, 47.5 wt. % propylene glycol, and 5 wt. % sodium acetate.

In the practice of this invention it may be desirable to add a corrosion inhibitor, such as triethanol amine, or methyl diethanol amine, provided, e.g., in amounts of from about 0.05 to 1 weight percent, based on the weight of the composition.

Various methods may be used to supply the compositions of this invention to the particulate mass. Standard treating procedures employed in the art for spraying a liquid uniformly onto a particulate mass may be employed. For example, the composition may be sprayed across a zone through which a stream of the particles to be treated is passed. A particular illustration of this would be to place an annular tube above a hopper car that is being loaded with the particulate mass. The tube contains a multiplicity of spray heads aimed at the interior area circumscribed by the tube and the tube acts as a manifold for the solution fed to the spray heads. The solution of the composition is fed to the tube at a rate to supply the desired amount of the composition on the particulate mass to be treated. The mass of particulates are fed through the tube into the hopper car. Another technique involves spraying the top of a mass of the particles and allowing the composition to drain through the mass to cover particles at the bottom as well.

Another technique involves dropping the particles onto a trough which feeds the particles to a hopper car or to a storage facility. While the particles run down the trough they are sprayed with a solution of the composition of this invention.

EXAMPLES

The following sets forth embodiments of this invention and is not intended to act to limit this invention.

PROCEDURES

(A) PREPARATION AND TESTING OF ICE CUBE SPECIMENS

Ice samples were prepared by first dissolving the desired percentage by weight of the chosen chemicals into "standard water" for a total solution weight of 40.00 grams. Standard water is prepared by allowing laboratory tap water to deaerate and equilibrate at room temperature (23° C.) for at least 24 hours before use.

The water solution was poured into leveled polyolefin molds with interior dimensions 1.50 inches (3.80 cm.)×1.15 inches (2.92 cm) at the bottom and 1.88 inches (3.80 cm.)×1.50 inches (3.80 cm) at the open top, with an interior height of 1.42 inches (3.60 cm), and frozen at −10° C. The ice remained in the mold for 18 to 24 hours before being removed for testing.

The compressive strength of these ice cubes was promptly determined using an Instron (Model TTC) physical testing device after being gently removed from their mold. The ice cubes were inserted between stainless steel plates of the 1000 lb. (453.59 kg.) cell of the tester and the plates were closed by an electric drive at a rate of 5 inches (12.7 cm.)/minute. The pressure at which the ice broke was recorded.

(B) PREPARATION AND TESTING OF PACKED COAL SPECIMENS

The effect of moisture content on the compressive strength of frozen particulate masses of coal was demonstrated. The coal employed was −⅜ inch (passed ⅜ inch mesh; 0.9525 cm mesh) Eastern metallurgical type coal.

The coal was air dried and the amount of water required to obtain 10% by wt. surface moisture was calculated by material balance. The desired agent was added to the water and the agent and water were thoroughly mixed to form a treating solution. Sixty gram samples of the coal particles were spread out as a monolayer on a sheet of polyethylene film. The treating solution was applied dropwise uniformly across the monolayer with a laboratory syringe and then the coal was dry blended with spatulas until the solution and coal were uniformly blended.

The coal was added to a 5 oz. (147.87 cc.) wax paper cup 2.75 inches (6.985 cm.) high with a bottom diameter of 1.75 inches (4.445 cm.) and a top diameter of 2.375 inches (6.0325 cm.). The treated samples were hand-packed and compacted with a wooden tamper to a height of 1.57 inches (3.9878 cm.) in each cup. The top of each container was covered with aluminum foil and the sealed containers were allowed to stand at room temperature for 24 hours prior to freezing at −10° C. for 18 to 24 hours. Each container was removed from the freezer and gently peeled away from the coal frozen inside. The compressive strength of the coal specimen was promptly determined using the Instron procedure described in (A) above.

Control A

This Control illustrates a composition as set forth in U.S. Pat. No. 4,117,214.

The composition was a liquid mixture of 47.5 weight percent of ethylene glycol, 47.5 weight percent of propylene glycol and 5.0 weight percent of sodium acetate.

The viscosity of this composition was measured in a standard Viscometer at 20° C., 0° C., and −20° C. and found to be 44,148 and 880 centistokes, respectively. The data is summarized in Table I.

This mixture was added in concentrations of 0.25, 0.50, and 1.0 weight percent to water and the water was frozen as described in Procedure A above. The compressive strength (psi) of the ice was then determined by the method of Procedure A and is set forth in Table II. The numerical value of the compressive strength is the average of the number of specimens tested, and is set forth in Table II. Table II also shows the percent reduction of compressive strength of the composition as compared to that of ice, which is 152 psi (based on the average of 250 tested specimens).

Control B

This Control illustrates another prior art composition.

The composition was a liquid mixture of 65 wt.% diethylene glycol, 20 wt.% methyl ether of dipropylene glycol, 10 wt.% of the average 7-mole ethylene oxide adduct of mixed 11-15 carbon secondary alkanols, and 5 wt.% water.

This mixture was added in concentrations of 0.25, 0.50 and 1.0 weight percent to water, the water frozen and tested as described in Control A.

The number of specimens tested, average compressive strength of these specimens and the percent reduction of the compressive strength as compared to that of ice, is set forth in Table II.

EXAMPLE I

The composition was a liquid mixture of 80 weight percent of ethylene glycol, 15 weight percent of ethylene glycol monoethyl ether and 5 weight percent of water.

The viscosity of this composition was measured in a standard Viscometer at 20° C., 0° C., and −20° C. and found to be 13, 36 and 111 centistokes, respectively. The data is summarized in Table I.

This liquid mixture was added in concentrations of 0.25, 0.50 and 1.0 weight percent to water, the water frozen, and tested as described in Control A.

The number of specimens tested, average compressive strength of these specimens and the percent reduction of the compressive strength as compared to that of ice, is set forth in Table II.

TABLE I

| Example | Viscosity in centistokes at: | | |
|---|---|---|---|
| | 20 | 0 | −20° C. |
| Control A | 44 | 148 | 880 |
| 1 | 13 | 36 | 111 |

The data in Table I shows that the composition of this invention has significantly lower viscosity than the composition of U.S. Pat. No. 4,117,214. Therefore, due to the lower viscosity of the composition of this invention, it can more easily be sprayed onto coal and it also penetrates the coal to a greater extent.

strength, using the mixture of this invention, is better than Control B but about the same as Control A.

Control C

The composition of this Control is the same as Control A, i.e., a composition as set forth in U.S. Pat. No. 4,117,214, which contains 47.5 weight percent of ethylene glycol, 47.5 weight percent of propylene glycol and 5.0 weight percent of sodium acetate.

The liquid mixture was added in amounts of 1.0, 2.0 and 3.0, parts of fluid per ton of coal, to 60 grams of coal packed as described in Procedure B, above. The surface moisture content of the packed coal was 10 weight percent of water. The packed coal specimens were prepared and tested for compressive strength by the procedure as described in Procedure B.

Table III shows the number of specimens tested, the average compressive strength of these samples and the percent reduction of compressive strength of the formula as compared to that of untreated wet coal which is 159.4 (based on the average of 51 tested specimens).

EXAMPLE 2

The procedure of Control C was exactly repeated except that the composition was a liquid mixture of the following:
- 40 wt. %. ethylene glycol
- 40 wt. % propylene glycol
- 15 wt. % ethylene glycol ethylether
- 5 wt. % water The results are shown in Table III.

EXAMPLE 3

The procedure of Control C was exactly repeated except that the composition was a liquid mixture of the following:
- 80 wt. % ethylene glycol
- 15 wt. % ethylene glycol ethyl ether
- 5 wt. % water The results are shown in Table III.

EXAMPLE 4

The procedure of Control C was exactly repeated except that the composition was a liquid mixture of the following:
- 42.5 wt. % ethylene glycol
- 42.5 wt. % propylene glycol
- 10 wt. % average of 6 mole ethoxylate of trimethyl nonanol
- 5 wt. % water

TABLE II

| | 0.25 | | | 0.50 | | | 1.0 | | |
|---|---|---|---|---|---|---|---|---|---|
| Example | No. of Specimens Tested | Compressive Strength (psi) | Reduction of Comp. Strength (%) | No. of Specimens Tested | Compressive Strength (psi) | Reduction of Compressive Strength (%) | No. of Specimens Tested | Compressive Strength (psi) | Reduction of Compressive Strength (%) |
| Control A (U.S. Pat. No. 4,117,214) | 39 | 104.9 | 31.0 | 46 | 93.0 | 38.8 | 32 | 63.5 | 58.2 |
| Control B | 30 | 135.1 | 11.1 | 26 | 100.0 | 34.2 | 22 | 84.7 | 44.3 |
| I | 15 | 91.7 | 39.7 | 15 | 81.0 | 46.7 | 15 | 63.4 | 58.3 |

The data in Table II shows that the percent reduction of the compressive strength, using the mixture of this invention (Example 1), is much greater at concentration of 0.25 and 0.50 weight percent than the mixture of Controls A and B. At high concentrations (1.0 weight percent) the percent reduction of the compressive The results are shown in Table III.

EXAMPLE 5

The procedure of Control C was exactly repeated except that the composition was a liquid mixture of the following:

30 wt. % ethylene glycol
30 wt. % propylene glycol
20 wt. % diethylene glycol
15 wt. % ethylene glycol ethyl ether
5 wt. % water
The results are shown in Table III.

EXAMPLE 6

The procedure of Control C was exactly repeated except that the composition was a liquid mixture of the following:
60 wt. % ethylene glycol
20 wt. % diethylene glycol
20 wt. % ethylene glycol ethyl ether
The results are shown in Table III.

The time the cell was in the freezer, the shear force, and the percent reduction in shear force of the composition as compared to that of water are set forth in Table IV.

Control F

This Control illustrates a prior art composition.
The composition was a liquid mixture of the following:
47.2 wt. % ethylene glycol
46 wt. % water
6.8 wt. % sodium acetate
The composition was mixed with water and coal and tested by the procedure as described in Control D.
The time the cell was in the freezer, the shear force

TABLE III

| | 1.0 | | | 2.0 | | | 3.0 | | |
|---|---|---|---|---|---|---|---|---|---|
| Example | No. of Specimens Tested | Compressive Strength (psi) | Reduction of Compressive Strength (%) | No. of Specimens Tested | Compressive Strength (psi) | Reduction of Compressive Strength (%) | No. of Specimens Tested | Compressive Strength (psi) | Reduction of Compressive Strength (%) |
| Control C | 19 | 90.5 | 43.2 | 20 | 64.3 | 59.7 | 20 | 46.8 | 70.6 |
| 2 | 32 | 86.8 | 45.5 | 32 | 70.0 | 56.1 | 32 | 56.2 | 64.7 |
| 3 | 20 | 93.5 | 41.3 | 20 | 65.4 | 49.0 | 20 | 60.8 | 61.9 |
| 4 | 16 | 85.7 | 46.2 | 16 | 71.5 | 55.1 | 15 | 52.6 | 67.0 |
| 5 | 8 | 116.2 | 27.1 | 8 | 80.6 | 49.4 | 8 | 75.4 | 52.7 |
| 6 | 7 | 101.6 | 36.3 | 8 | 59.3 | 62.8 | 8 | 74.1 | 53.5 |

Control D

The composition of this Control is the same as Control A, i.e., a composition as set forth in U.S. Pat. No. 4,117,214, which contains 47.5 weight percent of ethylene glycol, 47.5 weight percent of propylene glycol and 5.0 weight percent of sodium acetate.
0.55 cubic centimeters of the composition was mixed with 52.63 g of water. This mixture was then added to and mixed with 1000 g of the coal described in Procedure B. The moisture level of the coal was 5 percent water and the composition concentration was 1 pint per ton of coal.
A portion of the coal mixture was added to a cell 2.5 inches in diameter and ½ inch high. A 13.5 pound weight was placed on the cell and the cell was placed in a freezer at −3.89° C. for the time set forth in Table IV. At the same time this sample was prepared another sample was prepared in the same way except that it contained only the water mixed with the coal.
After being in the freezer for the time specified in Table IV, the cell was removed from the freezer the weight removed from the cell, a 1.16 pound weight placed on the cell and the cell immediately placed in a Jenike flow factor tester. The force necessary to break the sample (shear force) was then measured.
The shear force and the percent reduction in shear force of the composition as compared to that of water are set forth in Table IV.

Control E

The composition of this Control is the same as Control B, i.e., 65 weight percent diethylene glycol, 20 weight percent methyl ether of dipropylene glycol, 10 weight percent of the average 7-mole ethylene oxide adduct of mixed 11–15 carbon secondary alkanols, and 5 weight percent water.
The composition was mixed with water and coal cooled and tested by the procedure as described in Control D.

and the percent reduction in shear force of the composition as compared to that of water are set forth in Table IV.

Control G

This Control illustrates a prior art composition.
The composition was a liquid mixture of the following:
69 wt. % ethylene glycol
31 wt. % water
The composition was mixed with water and coal and tested by the procedure as described in Control D.
The time the cell was in the freezer, the shear force and the percent reduction in shear force of the composition as compared to that of water are set forth in Table IV.

EXAMPLE 7

The composition of this Example is the same as Example 3, i.e., 80 weight percent ethylene glycol, 15 weight percent ethylene glycol ethyl ether and 5 weight percent water.
The composition was tested by the procedure as described in Control D.
The time the cell was in the freezer, the shear force, and the percent reduction in shear force of the composition as compared to that of water are set forth in Table IV.

TABLE IV

| Example | Freezing time (hours) | Shear force* (lbs) of composition | Shear force* of water (lbs) | Decrease in shear force (%) |
|---|---|---|---|---|
| Control D | 24 | 3.59 | 4.30 | 17 |
| Control E | 23 | 4.20 | 4.45 | 6 |
| Control F | 24 | 3.75 | 4.10 | 9 |
| Control G | 24 | 2.88 | 3.25 | 11 |
| 7 | 23 | 2.78 | 4.15 | 33 |

*Represents the average of two samples

The data in the Table shows that the composition of this invention (Example 7) has a greater percent decrease in shear force than the compositions of the Controls. This indicates that the composition of this invention renders the ice formed easier to break when masses of coal, for example, have to be separated.

What is claimed is:

1. A process for treating particulate coal which comprises applying to the coal surface up to about 0.5 weight percent, based upon the moisture content of the coal being treated, of a liquid aqueous solution consisting essentially of:
   (1) from about 65 to about 95 weight percent of ethylene glycol;
   (2) from about 1 to about 25 weight percent of at least one alkyl ether of a glycol derived from ethylene oxide containing from 1 to 6 oxyethylene units selected from one or more compounds having the formula:

$$HO-(CH_2-CH_2-O)_{\overline{n}}R$$

wherein:
   R is alkyl containing 1 to 2 carbon atoms; and
   n is an integer of 1 to 6; and
   (3) up to about 30 weight percent water.

2. The process of claim 1 wherein n is about 1.

3. The process of claim 2 wherein R is ethyl and n is 1 providing ethylene glycol ethyl ether.

4. The process of claims 1, 2 or 3 wherein said solution contains:
   (1) from about 75 to about 85 weight percent ethylene glycol;
   (2) from about 10 to about 20 weight percent of said alkyl ether; and
   (3) from about 5 to about 10 weight percent water.

5. The process of claim 4 wherein the solution also contains propylene glycol.

6. The process of claims 1, 2 or 3 wherein the solution also contains propylene glycol.

* * * * *

UNITED STATES PATENT AND TRADEMARK OFFICE
CERTIFICATE OF CORRECTION

PATENT NO. : 4,594,076
DATED : November 23, 1983
INVENTOR(S) : Blake et al.

It is certified that error appears in the above-identified patent and that said Letters Patent is hereby corrected as shown below:

In Claim 4 at line 2 replace "contains" with
-- consisting essentially of --.

Signed and Sealed this

Fourteenth Day of October, 1986

[SEAL]

Attest:

DONALD J. QUIGG

Attesting Officer

Commissioner of Patents and Trademarks